(No Model.)
G. LETTENMYER.
HARROW.
No. 271,202. Patented Jan. 23, 1883.
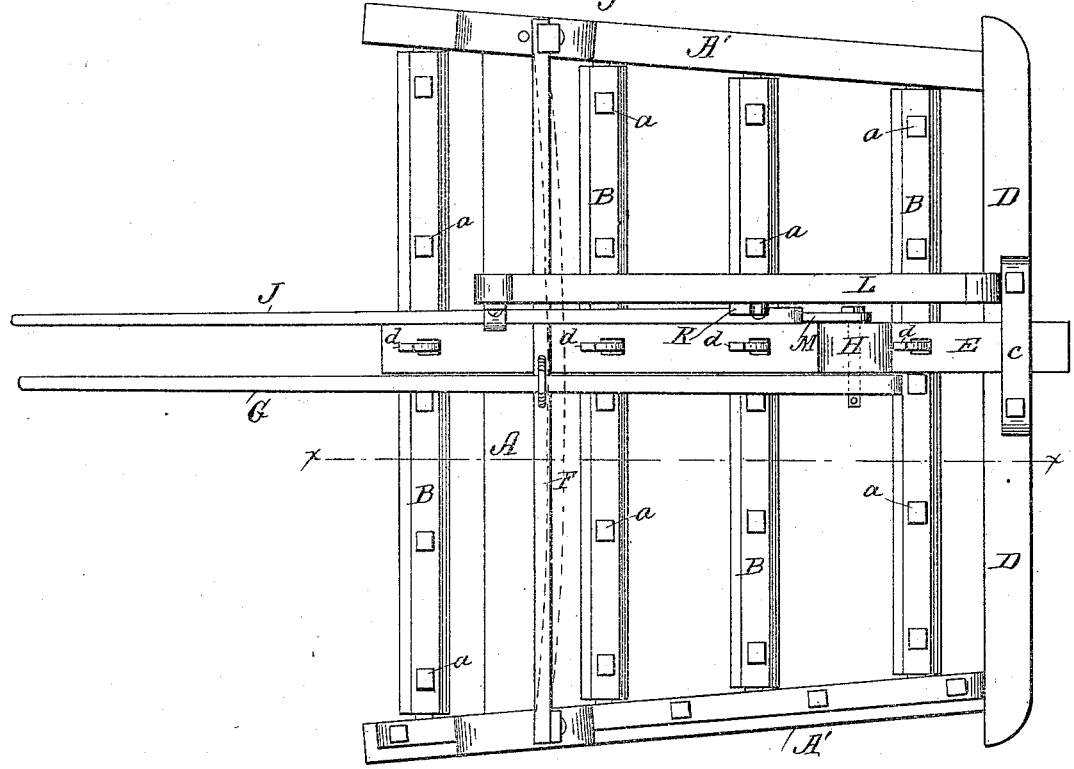
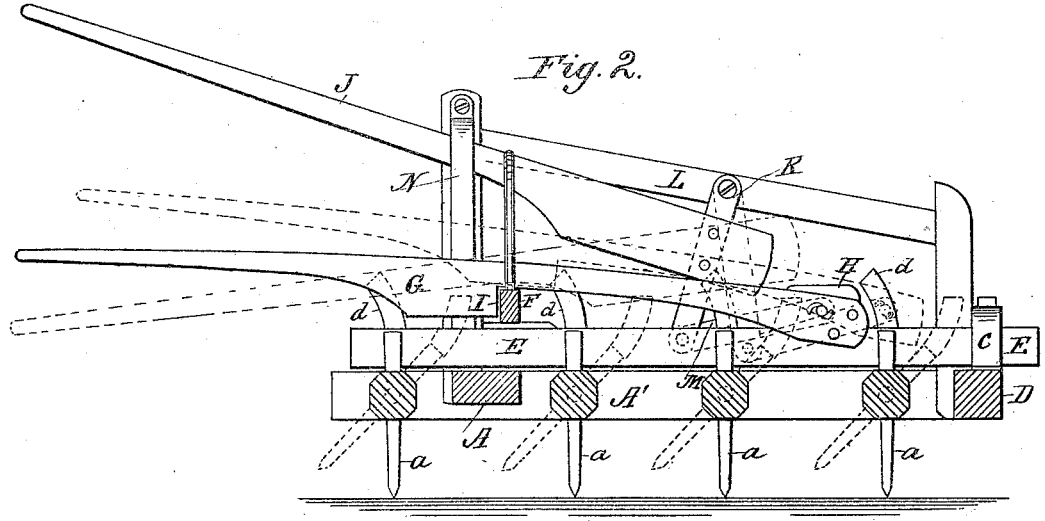
WITNESSES:
W. W. Hollingsworth
A. G. Sipe
INVENTOR:
George Lettenmyer
BY
ATTORNEYS.

UNITED STATES PATENT OFFICE.

GEORGE LETTENMYER, OF LITTLE GEORGETOWN, WEST VIRGINIA.

HARROW.

SPECIFICATION forming part of Letters Patent No. 271,202, dated January 23, 1883.

Application filed October 2, 1882. (No model.)

*To all whom it may concern:*

Be it known that I, GEORGE LETTENMYER, of Little Georgetown, in the county of Berkeley and State of West Virginia, have invented a new and useful Improvement in Harrows, of which the following is a full, clear, and exact description, reference being had to the annexed drawings, forming part of this specification.

This invention relates to an improvement upon the form of harrow described and illustrated in Letters Patent No. 214,671, granted to me under date of April 22, 1879, in which I have shown a series of pivoted harrow-teeth bars combined with a reversing-bar and a spring-bar adapted to hold the reversing-bar in a yielding manner to render the harrow-teeth yielding to obstruction; and the improvement consists in the combination of parts hereinafter described and claimed.

In the drawings, Figure 1 is a plan view of the improved harrow, and Fig. 2 is a vertical section through the line $x$ $x$ of Fig. 1.

A A' A' indicate the frame-work of the harrow, in which are supported the removable harrow-bars B, having harrow-teeth $a$, and adapted to oscillate in suitable bearings in the framework.

D indicates the head-beam, arranged transversely to the line of draft, and above this head-beam and through a keeper, $c$, at the front end of the frame, extends the reversing-bar E, which is connected to the harrow-bars by means of the arms $d$, projecting through slots in the bar E. With this construction a longitudinal reciprocation given to the bar E will oscillate the harrow-teeth bars and throw the teeth $a$ from a vertical position to an oblique position, as shown in dotted lines in Fig. 2, or vice versa, as the case may be.

Now, in the aforesaid Letters Patent I have shown in combination with the above construction a spring-bar arranged transversely to the line of draft, pivoted at one end to the frame, and adapted to be lifted through a keeper at the other end by means of a lever on the reversing-bar, whereby the reversing-bar, which I provided with a lug on the upper side adapted to rest against the spring-bar, might be held yieldingly in its normal position or moved longitudinally forward by another lever connected thereto and to the head-beam by first lifting the spring-bar out of engagement with the said lug. This construction, however, is open to the objection that the vertical oscillation of the spring-bar necessitates the location of the reversing-lever entirely to the rear of the spring-bar, where only a minimum of leverage can be secured. I therefore in my improved harrow make the spring-bar F stationary, and instead of the lug on the reversing-bar E, I provide a lever, G, pivoted to a projection, H, on the forward end of the bar E, and having a shoulder, I, in its under side adapted to fall behind the bar F and lock the reversing-bar when the latter is moved to its rearmost limit to throw the teeth $a$ to a vertical position. I am thus enabled to use a long reversing-lever, J, for operating the bar E, and this lever I arrange above the spring-bar with its forward end connected to an arm, K, which is pivoted to a supporting-frame, L, extending from the front to the rear of the harrow, and is connected to an arm, M, pivoted to the projection H on the reversing-bar E. The frame L is provided at its rear end with a keeper, N, for the lever J.

With this construction, when it is desired to reverse the harrow-teeth, it is only necessary to lift the lever G, when the draft forces the harrow-teeth rearward at their points, and when the teeth are to be returned to their normal position the lever J is to be lifted until the lever G, like a gravity-pawl, engages with the spring-bar F.

What I claim is—

The combination, with the harrow-frame, the harrow-teeth bars, and the reversing-bar, of the stationary spring-bar, the catch-lever adapted to engage with the spring-bar by gravity, and the reversing-lever arranged above the spring-bar and connected to the forward end of the reversing-bar and to a supporting bar or frame, substantially as and for the purpose specified.

GEORGE LETTENMYER.

Witnesses:
JNO. ALBURTIS,
R. M. COOPER.